US012738065B2

(12) United States Patent
Purswani et al.

(10) Patent No.: US 12,738,065 B2
(45) Date of Patent: Sep. 15, 2026

(54) METHOD FOR SURVEILLING AN AREA OF INTEREST USING DRONES

(71) Applicant: BULL SAS, Les Clayes-sous-Bois (FR)

(72) Inventors: Purshottam Purswani, New South Wales (AU); Teak Wei Chong, Pasir Gudang (MY)

(73) Assignee: BULL SAS, Les Clayes-sous-Bois (FR)

( * ) Notice: Subject to any disclaimer, the term of this patent is extended or adjusted under 35 U.S.C. 154(b) by 259 days.

(21) Appl. No.: 18/605,189

(22) Filed: Mar. 14, 2024

(65) Prior Publication Data

US 2024/0312215 A1 Sep. 19, 2024

(30) Foreign Application Priority Data

Mar. 16, 2023 (EP) .................................... 23305358

(51) Int. Cl.

| | |
|---|---|
| ***G06V 20/52*** | (2022.01) |
| ***G06T 7/11*** | (2017.01) |
| ***G06V 10/25*** | (2022.01) |
| ***G06V 10/762*** | (2022.01) |
| ***G06V 20/17*** | (2022.01) |

(52) U.S. Cl.

CPC ................ *G06V 20/52* (2022.01); *G06T 7/11* (2017.01); *G06V 10/25* (2022.01); *G06V 10/762* (2022.01); *G06V 20/17* (2022.01)

(58) Field of Classification Search

CPC .... G05D 1/104; G05D 2109/254; G05D 1/46; G05D 1/692; G05D 2109/20; B64U 2201/10; B64U 20/87; B64U 2201/102; B64U 2101/31; G06T 17/05; G06T 7/11; G06V 20/52; G06V 10/25; G06V 20/17; G06V 10/762

See application file for complete search history.

(56) References Cited

U.S. PATENT DOCUMENTS

| | | | | |
|---|---|---|---|---|
| 9,651,950 | B2 * | 5/2017 | Jang | G05D 1/0088 |
| 2019/0011920 | A1 * | 1/2019 | Heinonen | G05D 1/0094 |
| 2019/0205644 | A1 * | 7/2019 | Birchbauer | G06T 17/05 |

FOREIGN PATENT DOCUMENTS

| | | | | |
|---|---|---|---|---|
| EP | 2688016 A1 | | 1/2014 | |
| WO | WO-2021087750 A1 | * | 5/2021 | G05D 1/0202 |

OTHER PUBLICATIONS

Machine translation obtained from Google Patents of WO-2021087750-A1 (Year: 2021).*

European Search Report and Written Opinion issued in EP2330538.6 on Jul. 7, 2023 (9 pages).

(Continued)

*Primary Examiner* — Courtney Joan Nelson

(74) *Attorney, Agent, or Firm* — ARC IP Law, PC; Joseph J. Mayo

(57) ABSTRACT

The invention relates to a computer-implemented surveillance method for surveilling an area of interest using a set of drones, the surveillance method including monitoring a number of operational drones among the set of drones. If a change in the number of operational drones is detected, performing a segmentation step for segmenting the area of interest into N sub-areas, N being the current number of operational drones; and performing an affectation step for affecting each operational drone to a respective sub-area for surveilling said sub-area.

14 Claims, 4 Drawing Sheets

(56) References Cited

OTHER PUBLICATIONS

Bouras Abdelwahhab, et al., "Areas Division and Multiple UAV Coverage Path Planning for Gas Distribution Map", 2022 $19^{th}$ International Multi-Conference on Systems, Signals and Devices (SSD), IEEE May 6, 2022; pp. 1554-1560.

* cited by examiner

METHOD FOR SURVEILLING AN AREA OF INTEREST USING DRONES

This application claims priority to European Patent Application Number 23305358.6, filed 16 Mar. 2023, the specification of which is hereby incorporated herein by reference.

BACKGROUND OF THE INVENTION

Field of the Invention

At least one embodiment of the invention relates to a surveillance method for surveilling an area of interest using a set of drones.

At least one embodiment of the invention further relates to computer program and to a surveillance system for implementing said surveillance method.

One or more embodiments of the invention applies to the field of remote surveillance, and more specifically to geofencing.

Description of the Related Art

It is known to resort to a set (also referred to as "swarm") of autonomous drones to perform surveillance of an area of interest. Such surveillance may be needed in domains like disaster management, agriculture, or even oil and gas, or any other domain where there is a need to chart and explore known or unknown territory. Such surveillance may also be needed to perform geofencing, which involves detecting and tracking predetermined assets or targets in the area of interest.

By "drone", it is meant, in the context of the one or more embodiments of the invention, an unmanned vehicle. Such vehicle may be adapted to move on land, in the air, on water and/or underwater.

As an example, in the case of top-down surveillance, drones provide several advantages over satellites and planes. For instance, a drone is generally much cheaper than a plane or a satellite. Moreover, contrary to satellites, upgrades can quickly be performed on a drone to provide it with sensors that are suitable for a given surveillance campaign. Another advantage lies in the fact that the repeat cycle of a drone (i.e., the duration between two successive instants at which the drone revisits a same location) can be made as low as desired, contrary to a satellite. Furthermore, a drone is generally less visible than a plane.

Moreover, resorting to a swarm of drones allows to cover an area that is much larger than what could be covered by a single drone, which generally has a limited autonomy.

However, known surveillance methods implementing swarms of drones are not entirely satisfactory.

Indeed, in known methods, it is generally required that an operator divide the area of interest in sub-areas that have substantially the same surface, and that he assigns each drone to a respective sub-area for surveillance.

Yet, during a mission, operation of a given drone may be compromised. This may result from weather conditions, geography topology, hardware malfunction or system failure. Besides, a given drone may need to redock on its base station for recharging or refueling.

Consequently, the sub-area assigned to said drone remains without surveillance.

Therefore, a purpose of at least one embodiment of the present invention is to overcome at least one of these drawbacks.

Another purpose of at least one embodiment of the invention is to provide a surveillance method involving the use of a set of drones, wherein all the area of interest remains under surveillance, even if operation of part of the drones of the swarm is compromised, and without intervention of an operator.

BRIEF SUMMARY OF THE INVENTION

To this end, at least one embodiment of the invention is a surveillance method of the aforementioned type, the surveillance method comprising monitoring a number of operational drones among the set of drones, and, if a change in the number of operational drones is detected, performing:

- a segmentation step for segmenting the area of interest into N sub-areas, N being the current number of operational drones; and
- an affectation step for affecting each operational drone to a respective sub-area for surveilling said sub-area.

Indeed, the claimed method allows to adapt, in real time, and without the intervention of an operator, the number of sub-areas to the number of drones that are currently actually operational, that is to say the drones that are currently able to perform the desired surveillance task.

Such real-time adaptation results in a surveillance method that is self-healing, i.e. that automatically compensates for the unpredictable unavailability of one or several drones.

Advantageously, the surveillance method further includes one or more of the following features, taken individually or according to any technically possible combination:

- the sub-areas cover the whole area of interest without overlapping;
- the segmentation step includes:
- arranging a set of virtual points in a georeferenced representation of the area of interest;
- clustering the virtual points into N clusters based on a position of each virtual point, each cluster being associated with a respective point of interest, a position of each point of interest depending on a position of each virtual point of the associated cluster; and
- for each cluster, determining boundaries of a corresponding sub-area based on a position of the corresponding point of interest;
- during the segmentation step, the virtual points are arranged randomly in the georeferenced representation of the area of interest;
- the N clusters each include the same number of virtual points;
- clustering the virtual points into N clusters includes performing a k-means clustering;
- for each cluster, the respective point of interest is a centroid of the virtual points of said cluster;
- for each cluster, generating the corresponding sub-area includes computing a Voronoi diagram of the area of interest, each point of interest forming a seed of the Voronoi diagram, and the boundaries of each Voronoi cell forming the boundaries of a respective sub-area.

According to one or more embodiments of the invention, it is proposed a computer program comprising instructions, which when executed by a computer, cause the computer to carry out the steps of the surveillance method as defined above.

The computer program may be in any programming language such as C, C++, JAVA, Python, etc.

The computer program may be in machine language.

The computer program may be stored, in a non-transient memory, such as a USB stick, a flash memory, a hard-disc, a programmable electronic chip, etc.

The computer program may be stored in a computerized device such as a smartphone, a tablet, a computer, a server, a drone, etc.

The computer program may schedule for routine update and refactor to ensure the performance quality.

According to one or more embodiments of the invention, it is proposed a surveillance system including a control unit and a set of drones for performing surveillance of an area of interest, the control unit being configured to monitor a number of operational drones among the set of drones, the control unit being further configured, if a change in the number of operational drones is detected, to:

segment the area of interest into N sub-areas, N being the current number of operational drones; and affect each operational drone to a respective sub-area for surveilling said sub-area.

The control unit may be a personal device such as a smartphone, a tablet, a Smartwatch, a computer, any wearable electronic device, etc.

The control unit may execute one or several applications to carry out the method according to at least one embodiment of the invention.

The control unit may be loaded with, and configured to execute, the computer program according to at least one embodiment of the invention.

The control unit may be installed on a local server at a ground station to communicate with drones.

The control unit may be deployed in a cloud server and be connected to the drones and to a local ground station.

The system data log may be recorded for future reference and system maintenance.

Advantageously, the surveillance system further includes one or more of the following features, taken individually or according to any technically possible combination:

in order to segment the area of interest into N sub-areas, the control unit is configured to:

arrange a set of virtual points in a georeferenced representation of the area of interest;

cluster the virtual points into N clusters based on a position of each virtual point, each cluster being associated with a respective point of interest, a position of each point of interest depending on a position of each virtual point of the associated cluster; and for each cluster, determine boundaries of a corresponding sub-area based on a position of the corresponding point of interest, and, preferably, for each cluster, the respective point of interest being a centroid of the virtual points of said cluster;

the control unit is configured to randomly arrange the virtual points in the georeferenced representation of the area of interest;

the N clusters each include the same number of virtual points;

the processing unit is configured to perform a k-means clustering to cluster the virtual points into N clusters;

in order to generate the sub-area corresponding to each cluster, the processing unit is configured to compute a Voronoi diagram of the area of interest, each point of interest forming a seed of the Voronoi diagram, and the boundaries of each Voronoi cell forming the boundaries of a respective sub-area.

BRIEF DESCRIPTION OF THE DRAWINGS

Other advantages and features will become apparent on examination of the detailed description of at least one embodiment which is in no way limitative, and the attached figures, where.

DETAILED DESCRIPTION OF THE INVENTION

It is well understood that the one or more embodiments that will be described below are in no way limitative. In particular, it is possible to imagine variants of the at least one embodiment of the invention comprising only a selection of the characteristics described hereinafter, in isolation from the other characteristics described, if this selection of characteristics is sufficient to confer a technical advantage or to differentiate the at least one embodiment of the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the figures, elements common to several figures retain the same reference.

Figure 1:
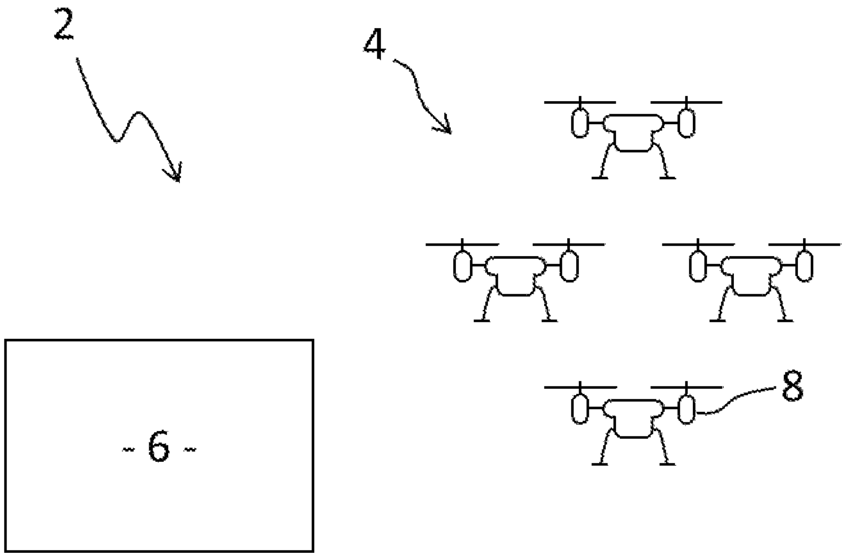
FIG. 1 is a schematic representation of a surveillance system according to one or more embodiments of the invention.
Figure 2:
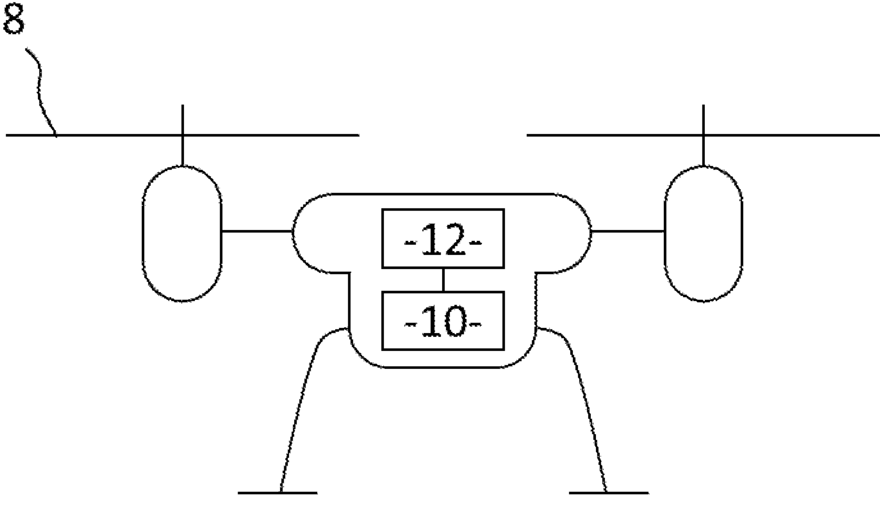
FIG. 2 is a schematic representation of a drone of the surveillance system of FIG. 1, according to one or more embodiments of the invention.

A surveillance system 2 according to one or more embodiments of the invention is shown on FIGS. 1 and 2.

The surveillance system 2 is configured to perform surveillance of an area of interest. More precisely, the limits of the area of interest have known geographic coordinates.

The surveillance system 2 includes a swarm 4 of drones and a control unit 6 in communication with each other.

Drones

The swarm of drones 4 includes at least one drone 8.

Each drone 8 is an unmanned drone configured to autonomously perform surveillance of a sub-area of the area of interest to which said drone is affected.

Affectation of each drone 8 to a corresponding sub-area will be described below.

As shown on FIG. 2, each drone 8 includes a surveillance module 10 and a communication module 12, according to one or more embodiments of the invention.

More precisely, for each drone 8, the surveillance module 10 is configured to detect and track targets in the respective sub-area. For instance, the surveillance module 10 includes an acquisition stage, a processing stage and a location stage (not shown).

The acquisition stage may be configured to acquire images of the respective sub-area. Furthermore, the processing stage may be configured to process the acquired images to detect the targets in said sub-area.

Alternatively, or in addition, the surveillance module 10 may be configured to acquire, for each target, a radio signal emitted by said target. For instance, said radio signal is a GPS (for "Global Positioning System") signal, an RFID (for "Radio Frequency Identification") signal, a Wi-Fi (for "Wireless Fidelity") signal and/or a cellular data signal. In this case, the processing stage is configured to process each acquired radio signal to detect the targets in the sub-area.

The location stage is configured to track each detected target in the area of interest. Preferably, the location stage is also configured to compute a position of each tracked target.

Furthermore, the location stage is configured to compute a position of the corresponding drone 8.

For each drone 8, the communication module 12 is configured to communicate with the control unit 6.

More precisely, for each drone 8, the corresponding communication module 12 is configured to inform the control unit 6 regarding the current position of the said drone 8.

The communication module 12 may also be configured to inform the control unit 6 that the corresponding drone 8 is operational.

The communication module 12 may be further configured to inform the control unit 6 regarding a current autonomy (e.g., a state of charge or a fuel reserve) of the corresponding drone 8. Alternatively, or in addition, the communication module 12 may also be configured to notify the control unit 6 that the corresponding drone 8 is returning to a corresponding docking station, for instance for recharging or refueling.

Advantageously, the communication module 12 is also be configured to send a unique identifier of the respective drone 8 to the control unit 6. This feature is advantageous, as it allows to authenticate each drone 8, thereby preventing invasion from an unknown source.

Preferably, the communication module 12 of each drone is configured to communicate with the communication module 12 of at least one of the other drones 8 of the swarm 4. This feature allows to improve efficiency and enable collaborative decision making. For instance, if a given drone detects a suspicious event, it can alert other drones in the swarm to validate and investigate a corresponding part of the area of interest closely, while freeing up other drones to cover other parts of the area of interest.

Advantageously, for security purposes, the communication module 12 is configured so that the communication with the control unit 6 is encrypted.

Advantageously, the communication module 12 is configured to communicate with the control unit 6 using wireless D2G ("device-to-gateway") communication. This feature is advantageous, as it allows for reduced transmission failure, delay fading, and message errors.

Control Unit 6

The control unit 6 is a hardware-based unit, such as a processor, an electronic chip, a calculator, a smartphone, a computer, a server (e.g., an on-premises server) and the like. Alternatively, or in addition, the processing unit 6 is a software-based unit, such as an application, a computer program (e.g., a computer program running in the cloud), a virtual machine and the like.

The control unit 6 is configured to receive, from a user, the coordinates of the area of interest where surveillance should be performed.

The control unit 6 is configured to provide instructions to each drone 8 of the swarm of drones 4 for performing surveillance.

More precisely, in at least one embodiment, the control unit 6 is configured to implement a surveillance method 20 (FIG. 3) in order to determine, in real time, and for each drone 8 of the swarm of drones 4, a corresponding sub-area for surveillance, and to affect each drone 8 to the corresponding sub-area.

Figure 3:
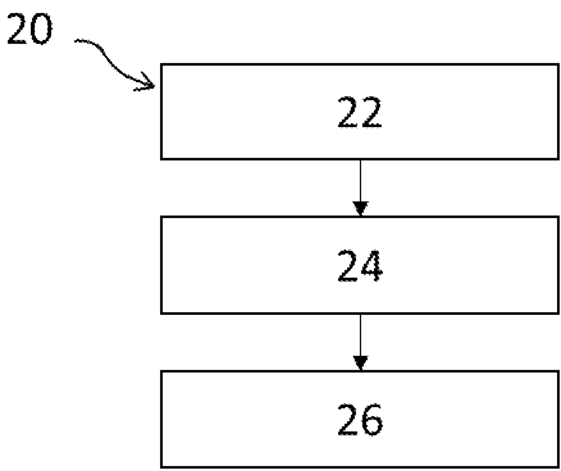
FIG. 3 is a flowchart of the surveillance method performed by the surveillance system of FIG. 1, according to one or more embodiments of the invention.

As shown on FIG. 3, by way of one or more embodiments, the processing method 20 comprises a monitoring step 22, a segmentation step 24 and an affectation step 26.

Monitoring Step 22

The control unit 6 is configured to, during the monitoring step 22, monitor a number N of operational drones 8 of the set of drones 4.

More specifically, the control unit 6 is configured to monitor, preferably continuously, the number of operational drones 8 based on the data received from each drone 8 through the corresponding communication module 12.

Moreover, the control unit 6 is configured to perform the segmentation step 24 and the affectation step 26 if it detects a change in the number of drones 8 that are currently operational.

Segmentation Step 24

Furthermore, the control unit 6 is configured to, during the segmentation step 24, segment the area of interest into N sub-areas, N being the current number of operational drones 8.

Advantageously, the sub-areas cover the whole area of interest without overlapping. This feature is advantageous, as having two or more drones perform surveillance on a same zone would be detrimental to efficiency. Moreover, this feature ensures that surveillance covers the entire area of interest.

Preferably, to perform such segmentation, the control unit 6 is configured to, during the segmentation step 24, arrange a set of virtual points in a georeferenced representation of the area of interest.

Figure 4A:
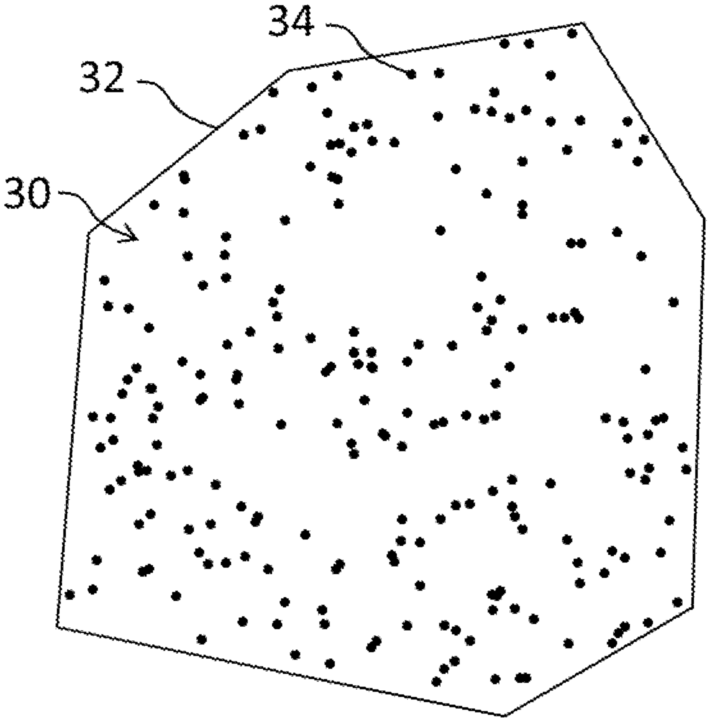
FIGS. 4A to 4D are maps representing an area of interest at successive steps of the surveillance method of FIG. 3, according to one or more embodiments of the invention.

An example of such arrangement is shown on FIG. 4A, according to one or more embodiments of the invention. In this figure, an exemplary georeferenced representation 30 of an area of interest is delimited by a border 32. Furthermore, each dot 34 represents one of the aforementioned virtual points.

Advantageously, the control unit 6 is configured to randomly arrange the virtual points in said georeferenced representation of the area of interest. This feature is advantageous, as it eventually results in sub-areas having similar surfaces without requiring an excessive computational cost.

Moreover, the control unit 6 is preferably configured to cluster the virtual points into N clusters, based on a position of each virtual point.

Figure 4B:
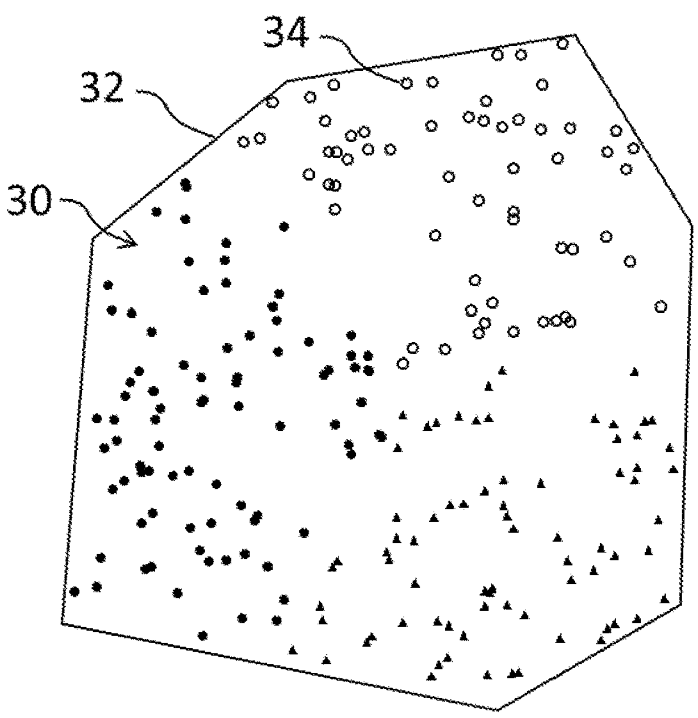

In the example of FIGS. 3A-3D, by way of one or more embodiments, it has been assumed that the current number of operational drones 8 is equal to 3, resulting in three clusters of virtual points. As can be seen on FIG. 4B, by way of one or more embodiments, the virtual points belonging to the first cluster are represented using a dark circle, the virtual points belonging to the second cluster are represented using a white circle, and the virtual points belonging to the third cluster are represented using a dark triangle.

Advantageously, the control unit 6 is configured so that the N clusters each include the same number of virtual points. This feature is advantageous, as it also results in sub-areas having similar surfaces, without an excessive computational cost.

Even more advantageously, the control unit 6 is configured to perform a k-means clustering to cluster the virtual points. In this case, the hyperparameter of the k-means clustering algorithm is the current number N of operational drones 8. This feature is advantageous, as such algorithm is simple and easy to implement. Such algorithm is also fast and efficient in terms of computational cost, which allows to rapidly adapt to a change in the number of operational drones 8.

Preferably, the control unit 6 is configured to determine, for each cluster, the boundaries of a respective sub-area.

More precisely, each cluster is associated with a respective point of interest. In this case, a position of each point of interest depends on a position of each virtual point of the associated cluster.

Preferably, for each cluster, the respective point of interest is a centroid of the virtual points of said cluster.

Figure 4C:
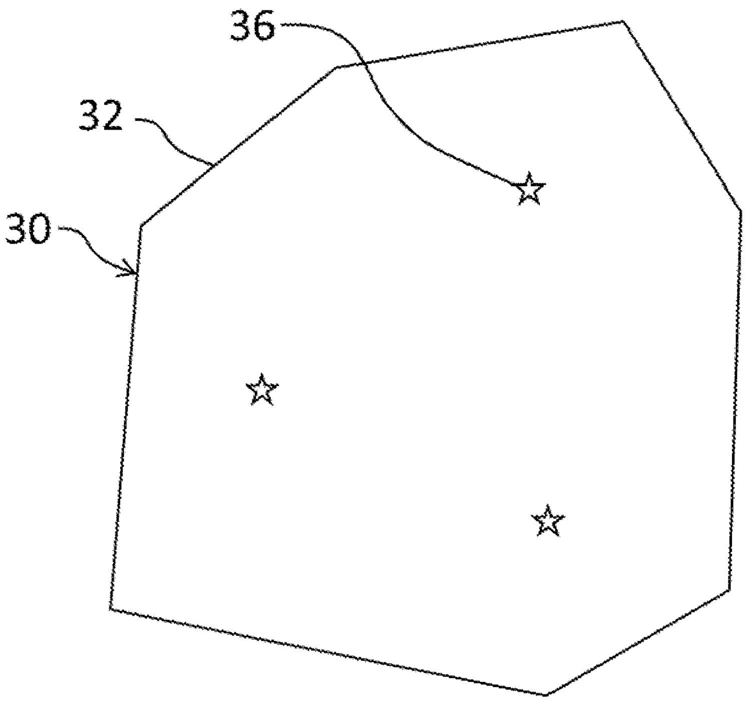

For instance, in FIG. 4C, by way of at least one embodiment, the centroid of each of the three clusters of virtual points is represented using a white star 36.

Moreover, the control unit 6 is preferably configured to determine, for each cluster, the boundaries of the respective sub-area based on the position of the corresponding point of interest.

Advantageously, the control unit 6 is configured to generate, for each cluster, the corresponding sub-area by computing a Voronoi diagram of the area of interest. In this case, each point of interest forms a seed of the Voronoi diagram, and the boundaries of each Voronoi cell form the boundaries of a respective sub-area. Using a Voronoi diagram is advantageous as it results in sub-areas that cover the entire area of interest. Besides, Voronoi diagram also performs spatial analysis to ensure that the sub-areas are similar in size in order to balance the workload for each drone.

Figure 4D:
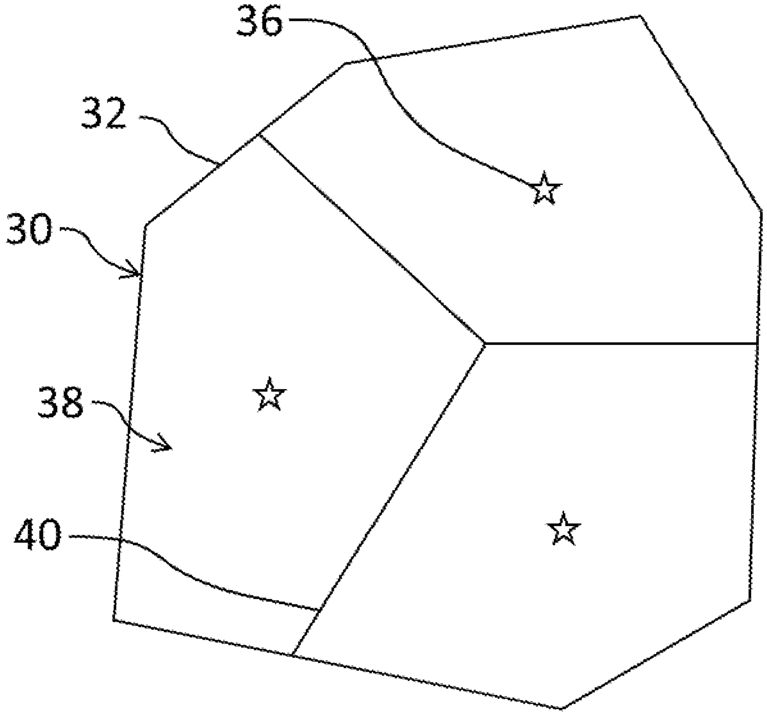

In the example of FIGS. 3A-3D, and as can be seen on FIG. 4D, by way of one or more embodiments, each of the three sub-areas 38 is delimited by a corresponding border 40 (also called "boundary").

Affectation Step 26

The control unit 6 is also configured to affect, during the affectation step 26, each drone 8 that is currently operational to a respective sub-area for surveilling said sub-area.

The control unit 6 may include additional features.

For instance, the control unit 6 is configured to decrypt and encrypt inbound and outbound data messages to ensure that data transmission between the control unit 6 and each drone 8 is secure.

The authentication module may also be configured to authenticate the identity of each drone 8 to avoid invasion from an unknown source.

The control unit 6 may also be configured to perform a pathing planning a space search algorithm to control the drone swarm 4 flying behaviors to perform specific goals like target searching. For instance, in the case where a single target is looked for, when the target is detected or found by one of the drones, the nearest drone will be alerted and will fly to the inspected sub-area for validation. Once the target is confirmed, the whole swarm will be requested to perform space search algorithm to fly back to a corresponding base station. Thus, the pathing planning and space search algorithm is included to optimize the flying path.

The control unit 6 may also be configured to compute, for each drone 8, a corresponding path (e.g., a flying path) to perform surveillance of the respective sub-area. This feature allows to improve the flying distance by reducing the number of waypoints.

The control unit 6 may also be configured to implement a collision detection and avoidance algorithm to control the drones flying in a swarm without colliding and crashing with each other. Indeed, due to the limited computation power and battery life of drone, computational task is designed to be performed at the control unit 6. Meanwhile, each drone 8 operates as an edge device for data collection and data communication. This implementation reduces the drone computational requirement and prolongs drone's battery life.

Alternatively, the control unit 6 is embedded in a drone of the swarm of drones, acting as a master drone.

Having the sub-areas cover the whole area of interest without overlapping is advantageous, as having two or more drones perform surveillance on a same zone would be detrimental to efficiency. Moreover, this feature ensures that surveillance covers the entire area of interest.

Randomly arranging the virtual points in the georeferenced representation of the area of interest is advantageous, as this feature eventually results in sub-areas having similar surfaces without requiring an excessive computational cost.

Having the N clusters include the same number of virtual points is advantageous, as this feature also results in sub-areas having similar surfaces, without an excessive computational cost.

Performing a k-means clustering algorithm to cluster the virtual points is advantageous, as such algorithm is simple and easy to implement. Such algorithm is also fast and efficient in terms of computational cost, which allows to rapidly adapt to a change in the number of operational drones 8.

Using a Voronoi diagram to generate the sub-area is also advantageous, as it results in sub-areas that cover the entire area of interest. Besides, Voronoi diagram also performs spatial analysis to ensure that the sub-areas are similar in size in order to balance the workload for each drone.

Operation

Operation of the surveillance system 2 will now be described with reference to FIG. 2, according to one or more embodiments of the invention.

During the monitoring step 22, the control unit 6 monitors, preferably continuously, the number N of operational drones 8 of the set of drones 4.

If the control unit 6 detects a change in the number of drones 8 that are currently operational, then, the control unit 6 performs the segmentation step 24.

More precisely, during the segmentation step 24, the control unit 6 segments the area of interest into N sub-areas, N being the current number of operational drones 8.

For instance, to perform such segmentation, the control unit 6 randomly arranges a set of virtual points in a georeferenced representation of the area of interest. Then, the control unit 6 clusters the virtual points into N clusters, based on a position of each virtual point, preferably using a k-means clustering algorithm. Then, for each cluster, the control unit 6 determines the boundaries of a respective sub-area, preferably by computing a Voronoi diagram of the area of interest, with the centroid of each cluster forming a seed of the Voronoi diagram, and the boundaries of each Voronoi cell forming the boundaries of a respective sub-area.

Then, during the affectation step 26, the control unit 6 affects each drone 8 that is currently operational to a respective determined sub-area for surveilling said sub-area.

Of course, the at least one embodiment of the invention is not limited to the examples detailed above.

The invention claimed is:

1. A computer-implemented surveillance method for surveilling an area of interest using a set of drones, the computer-implemented surveillance method comprising:

monitoring a number of operational drones among the set of drones, and, when a change in the number of operational drones is detected, performing a segmentation step for segmenting the area of interest into N sub-areas, N being a current number of operational drones; and an affectation step for affecting each operational drone of the number of operational drones to a respective sub-area for surveilling said respective sub-area, wherein the segmentation step comprises arranging a set of virtual points in a georeferenced representation of the area of interest;

clustering the set of virtual points into N clusters based on a position of each virtual point of the set of virtual points, wherein each cluster of the N clusters being associated with a respective point of interest, and wherein a position of each point of interest of the respective point of interest of said each cluster depends on a position of said each virtual point of said each cluster associated therewith; and for said each cluster, determining boundaries of a corresponding sub-area based on a position of the each point of interest corresponding thereto.

2. The computer-implemented surveillance method according to claim 1, wherein the N sub-areas cover a whole area of interest without overlapping.

3. The computer-implemented surveillance method according to claim 1, wherein, during the segmentation step, the set of virtual points are arranged randomly in the georeferenced representation of the area of interest.

4. The computer-implemented surveillance method according to claim 1, wherein the N clusters each include a same number of virtual points.

5. The computer-implemented surveillance method according to claim 1, wherein clustering the set of virtual points into said N clusters includes performing a k-means clustering.

6. The computer-implemented surveillance method according to claim 1, wherein, for said each cluster, the respective point of interest is a centroid of the set of virtual points of said each cluster.

7. The computer-implemented surveillance method according to claim 1, wherein, for said each cluster, generating the corresponding sub-area that includes computing a Voronoi diagram of the area of interest, wherein said each point of interest forms a seed of the Voronoi diagram, and wherein boundaries of each Voronoi cell form boundaries of a respective sub-area.

8. A non-transitory computer-readable storage medium comprising a computer program comprising instructions, which when executed by a computer, cause the computer to carry out a computer-implemented surveillance method for surveilling an area of interest using a set of drones, the computer-implemented surveillance method comprising:

monitoring a number of operational drones among the set of drones, and, when a change in the number of operational drones is detected, performing a segmentation step for segmenting the area of interest into N sub-areas, N being a current number of operational drones; and an affectation step for affecting each operational drone of the number of operational drones to a respective sub-area for surveilling said respective sub-area, wherein the segmentation step comprises arranging a set of virtual points in a georeferenced representation of the area of interest;

clustering the set of virtual points into N clusters based on a position of each virtual point of the set of virtual points, wherein each cluster of the N clusters being associated with a respective point of interest, and wherein a position of each point of interest of the respective point of interest of said each cluster depends on a position of said each virtual point of said each cluster associated therewith; and for said each cluster, determining boundaries of a corresponding sub-area based on a position of the each point of interest corresponding thereto.

9. A surveillance system comprising:

a control unit; and a set of drones that perform surveillance of an area of interest, wherein the control unit is configured to monitor a number of operational drones among the set of drones, when a change in the number of operational drones is detected, segment the area of interest into N sub-areas, N being a current number of the number of operational drones; and affect each operational drone of the number of operational drones to a respective sub-area for surveilling said respective sub-area, wherein, in order to segment the area of interest into N sub-areas, the control unit is further configured to arrange a set of virtual points in a georeferenced representation of the area of interest;

cluster the set of virtual points into N clusters based on a position of each virtual point of the set of virtual points, each cluster being associated with a respective point of interest, and a position of each point of interest of the respective point of interest of said each cluster depending on a position of said each virtual point of the each cluster associated therewith; and for said each cluster, determine boundaries of a corresponding sub-area of the N sub-areas based on a position of the respective point of interest, corresponding thereto.

10. The surveillance system according to claim 9, wherein, for each cluster, the respective point of interest being a centroid of the set of virtual points of said each cluster.

11. The surveillance system according to claim 9, wherein the control unit is further configured to randomly arrange the set of virtual points in the georeferenced representation of the area of interest.

12. The surveillance system according to claim 9, wherein the N clusters each include a same number of virtual points.

13. The surveillance system according to claim 9, wherein the control unit is further configured to perform a k-means clustering to cluster the set of virtual points into said N clusters.

14. The surveillance system according to claim 9, wherein, in order to generate the respective sub-area corresponding to said each cluster, the control unit is further configured to compute a Voronoi diagram of the area of interest, said each point of interest forming a seed of the Voronoi diagram, and boundaries of each Voronoi cell forming the boundaries of the corresponding sub-area.

* * * * *